United States Patent
Ono et al.

(10) Patent No.: US 6,403,178 B1
(45) Date of Patent: Jun. 11, 2002

(54) POLYMER ALLOYS AND RESIN MOLDED PRODUCTS

(75) Inventors: Satoru Ono, Gifu-ken; Junji Koizumi, Nagoya, both of (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 09/632,210

(22) Filed: Aug. 3, 2000

(30) Foreign Application Priority Data

Sep. 6, 1999  (JP) ............................................. 11-251582

(51) Int. Cl.$^7$ ............................ C08L 23/10; H01M 2/02

(52) U.S. Cl. .................. 428/35.7; 428/39.92; 429/176; 525/92 D; 525/133

(58) Field of Search .............................. 525/133, 92 D; 428/35.7, 36.92; 429/176

(56) References Cited

U.S. PATENT DOCUMENTS 6,045,883 A * 4/2000 Akiyama .................... 428/35.7

FOREIGN PATENT DOCUMENTS

| JP | 8-5998 | 1/1996 |
| JP | 9-180689 | 7/1997 |

* cited by examiner

*Primary Examiner*—Patricia A. Short
(74) *Attorney, Agent, or Firm*—Pillsbury Winthrop LLP

(57) ABSTRACT

A polymer alloy containing a crystalline polypropylene, a polyphenylene ether and a syndiotactic polystyrene where the polyphenylene ether is finely dispersed in the crystalline polypropylene and the syndiotactic polystyrene is dispersed in the polyphenylene ether. The polymer alloy of the present invention comprises crystalline polypropylene/polyphenylene ether and can be improved in heat resistance, high-temperature rigidity and impact resistance without increasing the ratio of the polyphenylene ether and, furthermore, is excellent in moldability.

7 Claims, 1 Drawing Sheet

POLYMER ALLOYS AND RESIN MOLDED PRODUCTS

BACKGROUND OF THE INVENTION

The present invention relates to polymer alloys required to have chemical resistance, heat resistance and a breaking extension higher than a given level. Particularly, it relates to polymer alloys suitable for battery cases mounted on electric cars and parts of anti-freeze systems for cars.

Conventional battery cases mounted on cars are mainly made of metals. However, with increase of weight, those which are made of plastics are put on the market from the viewpoints of chemical resistance (rust prevention) and insulation properties, and, especially, many of the battery cases are made of plastics mainly composed of crystalline polypropylene (crystalline PP) from the viewpoints of weight-saving and resistance to storage battery electrolytes (resistance to inorganic chemicals).

However, crystalline PP per se is inferior in heat resistance to other polar plastics. Therefore, addition of inorganic fillers such as glass fibers can be considered, but addition of the inorganic fillers causes increase of flexural modulus (rigidity) and decrease of elongation (decrease of pressure resistance) and, in addition, decrease of impact resistance (toughness) and moldability (fluidity). Furthermore, glass fibers which are general inorganic fillers for crystalline PP are weak against alkaline chemicals and are not necessarily suitable as fillers.

Under the circumstances, it is proposed in JP-B-8-5998 to blend crystalline PP with polyphenylene ether (PPE) excellent in heat resistance and impact resistance (especially at low temperatures) (see Comparative Example 1).

However, considering the mounting of batteries (storage batteries) on electric cars, etc. in the future, further improvement of heat resistance, high-temperature rigidity (flexural modulus) and impact resistance will be demanded. In this case, if blending ratio of PPE to the crystalline PP is increased, heat resistance is improved to some extent, but fluidity lowers (injection molding being difficult). Furthermore, it has been found that if the blending ratio of PPE is increased, uniform dispersion becomes difficult and, as a result, stable mechanical properties cannot be obtained and problems are caused in chemical resistance (acid resistance, alkali resistance).

SUMMARY OF THE INVENTION

In view of the above problems, the object of the present invention is to provide a polymer alloy comprising crystalline PP and PPE which can be improved in heat resistance, high-temperature rigidity and impact resistance without increasing the blending ratio of PPE and which is excellent in moldability (fluidity of materials).

The polymer alloy of the present invention solves the above problems by employing the following constitution.

That is, the polymer alloy of the present invention comprises a crystalline polypropylene, a polyphenylene ether and a syndiotactic polystyrene, wherein the polyphenylene ether is finely dispersed in the crystalline polypropylene and the syndiotactic polystyrene is dispersed in the polyphenylene ether.

The polymer alloy of the present invention preferably contains 2–41 wt % of the syndiotactic polystyrene.

Moreover, the polymer alloy of the present invention comprises a crystalline polypropylene, a polyphenylene ether and a syndiotactic polystyrene, and molded products made from the polymer alloy have a heat distortion temperature (ASTM D 790) of 105° C. or higher and a high-temperature flexural modulus (ASTM D 790: 80°C.) of 1000 MPa or higher.

In addition, the molded products preferably have a high-temperature flexural strength (ASTM D 790: 80°C.) of 29 MPa or more and, besides, an Izod impact strength (ASTM D 256: 23°C.) of 300 J/m or more.

The polymer alloy of the present invention usually comprises 34–57 wt % of a crystalline polypropylene, 25–41 wt % of a polyphenylene ether and 2–41 wt % of a syndiotactic polystyrene, the weight ratio of the crystalline polypropylene/polyphenylene ether being 2/1–1/1.

DETAILED DESCRIPTION OF THE INVENTION

Figure 3:
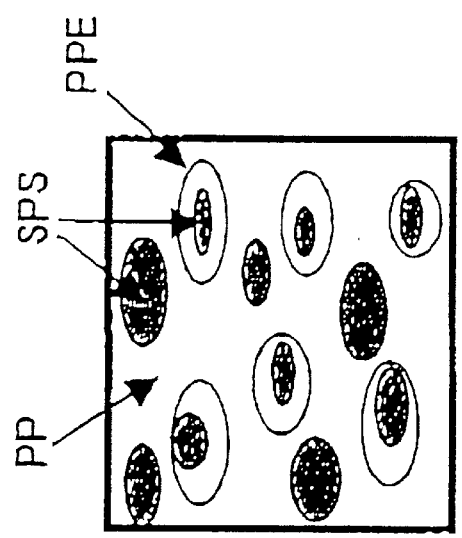
FIG. 3 shows a morphology of a polymer alloy comprising a crystalline PP, a PPE and an excess amount of an SPS.

The polymer alloy of the present invention is based on the assumption that the polymer alloy essentially comprises a crystalline polypropylene (crystalline PP) blended with a polyphenylene ether (PPE) to improve heat resistance and pressure resistance.

The crystalline PP here includes a homopolymer of propylene, and, in addition, a block copolymer obtained by polymerizing propylene at the first step and copolymerizing, for example, ethylene and an α-olefin such as propylene or butene-1 at the second step, and a random copolymer obtained by copolymerizing propylene and an α-olefin such as ethylene or butene-1, and it is fundamentally an isotactic polymer.

These homopolymers, block copolymers or random copolymers of propylene can be obtained, for example, by carrying out the polymerization in the presence of a catalyst comprising a combination of titanium trichloride and an alkylaluminum compound which is usually called a Ziegler-Natta catalyst.

Furthermore, PPE here is a resin represented by the following formula [I]:

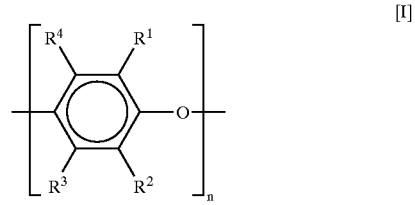

[I]

(wherein $R^1$, $R^2$, $R^3$ and $R^4$ may be the same or different and each represents a hydrogen atom, a halogen atom such as chlorine atom, bromine atom, fluorine atom or the like, an alkyl group such as methyl group, ethyl group, propyl group, butyl group or the like, an alkoxy group, a cyano group, a nitro group, an amino group, a phenoxy group or a sulfone group, and n is an integer denoting a polymerization degree and is 20–1000.

Representative examples of the homopolymers of PPE are poly(2,6-dimethyl-1,4-phenylene ether), poly(2-methyl-6- ethyl-1,4-phenylene ether), poly(2-methyl-6-phenyl-1,4-phenylene ether) and poly(2,6-dichloro-1,4-phenylene ether). Representative examples of the copolymers are polyphenylene ether copolymers such as copolymers of 2,6-dimethylphenol and other phenols (e.g., 2,3,6-trimethylphenol and 2-methyl-6-butylphenol). Among them, poly(2,6-dimethyl-1,4-henylene ether) and a copolymer of 2,6-dimethylphenol and 2,3,6-trimethylphenol are preferred, and poly(2,6-dimethyl-1,4-phenylene ether) is more preferred.

Blending ratio (weight ratio) of the crystalline PP and the PPE is usually 3/1–1/1, preferably 2/1–1/1. If the amount of PPE is too small, sufficiently heat resistance and impact resistance can hardly be obtained, and if the amount of PPE is too large, moldability (fluidity of materials) is deteriorated, and uniform dispersion of the polymer alloy becomes difficult to rather cause problems in strength (such as impact resistance). Moreover, if the amount of PPE is too large, relatively the content of the crystalline PP decreases to hinder weight-saving which is one of the effects of using the crystalline PP.

The characteristic of the present invention is that the above polymer alloy is blended with a syndiotactic polystyrene (SPS), whereby the SPS is selectively dispersed in the PPE which is finely dispersed in the crystalline PP.

SPS here is a polymer having the repeating units represented by the following formula [II] and having a polymerization degree of 5 or higher:

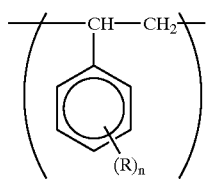

[II]

(wherein R represents a hydrogen atom, a halogen atom or a substituent containing carbon, oxygen, nitrogen, sulfur, phosphoric acid or silicon, and n represents an integer of 1–3), and is a styrene polymer having a stereospecificity of syndiotactic structure.

The styrene polymers in the present invention have the structural units (repeating units) represented by the above formula [II], and include polystyrenes and various nuclear-substituted polystyrenes such as polyalkylstyrenes and polyhalogenated styrenes.

As examples of SPS, mention may be made of polystyrene; poly(alkylstyrenes) such as poly(p-methylstyrene), poly(m-methylstyrene), poly(o-methylstyrene), poly(2,4-dimethylstyrene), poly(2,5-dimethylstyrene), poly(3,4-dimethylstyrene), poly(3,5-dimethylstyrene) and poly(p-t-butylstyrene); poly(halogenated styrenes) such as poly(p-chlorostyrene), poly(m-chlorostyrene), poly(o-chlorostyrene), poly(p-bromostyrene), poly(m-bromostyrene), poly(o-bromostyrene), poly(p-fluorostyrene), poly(m-fluorostyrene), poly(o-fluorostyrene), and poly(o-methyl-p-fluorostyrene); poly(halogen-substituted alkylstyrenes) such as poly(p-chloromethylstyrene), poly(m-chloromethylstyrene) and poly(o-chloromethylstyrene); poly(alkoxystyrenes) such as poly(p-methoxystyrene), poly(m-methoxystyrene), poly(o-methoxystyrene), poly(p-ethoxystyrene), poly(m-ethoxystyrene) and poly(o-ethoxystyrene); poly(carboxyester styrenes) such as poly(p-carboxymethylstyrene), poly(m-carboxymethylstyrene) and poly(o-carboxymethylstyrene); poly(alkyl ether styrenes) such as poly(p-vinylbenzylpropyl ether); poly(alkylsilyl-styrenes) such as poly(p-trimethylsilylstyrene); and other poly(styrene derivatives) such as poly(vinyl-benzenesulfonate) and poly(vinylbenzyldimethoxy phosphide).

The SPS used in the present invention has the syndiotactic structure, namely, a stereostructure in which phenyl groups or substituted phenyl groups that are side chains are located alternately on the opposite side in respect to the main chain comprising carbon-carbon bonds.

The SPS used in the present invention may not necessarily be a single compound, but may be a mixture of a styrene polymer of syndiotactic structure with a styrene polymer of isotactic or atactic structure or a copolymer of a styrene polymer of syndiotactic structure with a styrene polymer of isotactic or atactic structure. Furthermore, the styrene polymer may be a mixture of those which differ in molecular weight and includes those which have a polymerization degree of at least 5, preferably at least 10.

Content of the SPS in the polymer alloy is preferably 2–41 wt %, more preferably 7–35 wt %.

Here, when the polymer alloy is a polymer alloy of the three components comprising crystalline PP, PPE and SPS blended in an amount of 2–41 wt %, it is preferred that the content of the crystalline PP is 34–57 wt % and that of the PPE is 25–41 wt %, and the ratio (weight ratio) of the crystalline PP/PPE is 2/1–1/1. As far as the characteristics (the effects of the present invention) to be obtained by the mixing of the above three polymer components are not damaged, other polymers can be added in a small amount.

If the content of SPS is too small, the effects of the present invention (improvement of heat resistance, high-temperature rigidity and impact resistance without increasing the blending ratio of PPE to the crystalline PP) can hardly be obtained. On the other hand, if the content of SPS is too large, the content of PPE relatively decreases to cause deterioration of heat resistance and, besides, deterioration of breaking extension, and, hence, in the case of being applied to battery cases, the desired heat resistance and pressure resistance can hardly be obtained (see FIG. 3 and Comparative Example 2 of Table 1).

Figure 2:
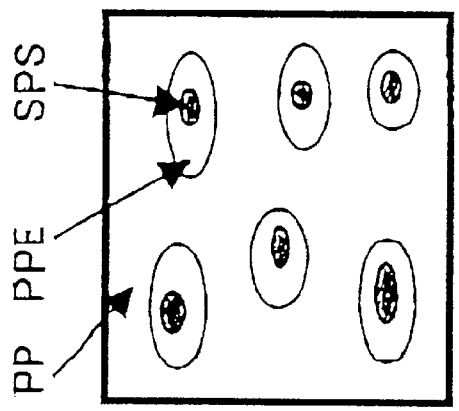
FIG. 2 shows a morphology of the polymer alloy of the present invention.
Figure 1:
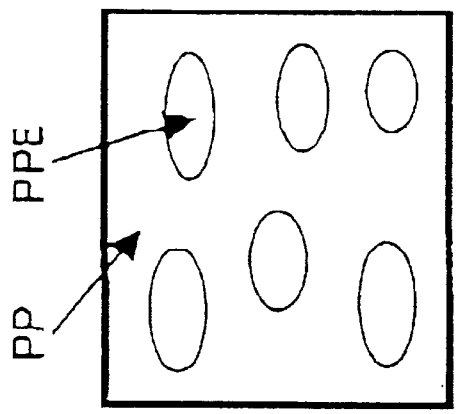
FIG. 1 shows a morphology of a polymer alloy comprising a crystalline PP and a PPE.

Morphology of the polymer alloys of the present invention will be explained referring to FIGS. 1–3. FIG. 1 illustrates a morphology of a polymer alloy obtained by blending a crystalline PP with PPE. When crystalline PP is blended with PPE, PPE is finely dispersed in the crystalline PP, and the resulting polymer alloy has a sea-islands structure comprising the crystalline PP as a sea phase and PPE as an island phase. FIG. 2 illustrates a morphology of the polymer alloy of the present invention comprising the polymer alloy illustrated in FIG. 1 which is blended with SPS. In the polymer alloy of the present invention, SPS is selectively dispersed in PPE finely dispersed in the crystalline PP. FIG. 3 illustrates a morphology of a polymer alloy comprising the polymer alloy of FIG. 1 which is blended with SPS in an excess amount. As can be seen, if the amount of SPS is excessive, SPS is dispersed not only in PPE, but also in the crystalline PP, and thus the selective dispersion of SPS in PPE cannot be attained.

As far as attainment of the object of the present invention is not hindered, namely, moldability and properties of the molded products are not damaged, the polymer alloy may contain various known additives (auxiliary materials) such as inorganic fillers, flame retardants, flame retarding aids, stabilizers (antioxidants, light stabilizers), lubricants, plasticizers, releasing agents, colorants, and, furthermore, other thermoplastic resins. These additives are suitably added to the polymer alloys to obtain molding materials.

As the inorganic fillers, there may be used, for example, inorganic fibers such as glass fibers and/or particulate fillers such as talc, calcium carbonate and mica which are surface treated with coupling agents. This is for keeping the dispersibility of the inorganic fillers.

The above molding material is a particulate material such as pellets or a sheet-like material obtained by adding, if necessary, the additives to each of the component polymers for the polymer alloy and well kneading the component polymers by a Banbury mixer, an extruder for kneading or the like at a suitable temperature, for example, 270–320° C. The resulting molding material is made into a resin molded product such as a battery case by known molding methods such as injection molding, blow molding, vacuum molding and compression molding. If necessary, the molded product may be subjected to a post-heat treatment (annealing) to remove thermal strain.

The resulting resin molded products are satisfactory in moldability and, in addition, are improved in heat resistance, impact resistance and high-temperature rigidity, and, besides, are less in deterioration of breaking extension. Therefore, the resin molded products of the present invention are suitable as battery cases required to have these properties of molded products. Furthermore, the resin molded products of the present invention are excellent in resistance to LLC and are suitable for parts of anti-freeze systems. The parts of anti-freeze systems include water pipes, radiator tanks, water pump housings, water valves, etc.

As mentioned above, in the polymer alloy of the present invention, crystalline polypropylene (crystalline PP) is blended with polyphenylene ether (PPE) in order to improve heat resistance and pressure resistance, and this is further blended with syndiotactic polystyrene (SPS), whereby PPE is finely dispersed in the crystalline PP, and SPS is dispersed in PPE. Therefore, the polymer alloy of the present invention exhibits the following effects.

In the case of the polymer alloys of the present invention, heat resistance, high-temperature rigidity and impact resistance of molded products made therefrom can be improved without increasing the ratio of PPE in the polymer alloys comprising crystalline PP and PPE, and, further, the polymer alloys are excellent in moldability (fluidity of molding material). Therefore, the polymer alloys of the present invention are suitable as molding materials for battery cases and parts of anti-freeze systems for cars which are required to have the above characteristics and, besides, required to be lightweight and thin-walled.

Furthermore, since heat resistance and rigidity of the polymer alloys can be increased without addition of inorganic fillers which are readily damaged by inorganic chemicals and cause reduction of impact resistance, they are further suitable as battery cases which are filled with inorganic chemicals. Moreover, although the polymer alloys are high in high-temperature rigidity, they are good in moldability, and battery cases can be thin-walled and thus they contribute to further weight saving.

DESCRIPTION OF PREFERRED EMBODIMENTS

Test examples carried out to confirm the effects of the present invention will be explained below.

Test methods for the properties were carried out in accordance with the following technical standards.

① Heat distortion temperature: ASTM D 790; load: 1.82 MPa.

② Izod impact strength (23° C.): ASTM D 256.

③ Flexural modulus (23° C., 80° C.) : ASTM D 790.

④ Flexural strength (23° C, 80° C.) : ASTM D 790.

⑤ Breaking extension: ASTM D 638.

⑥ Breaking strength: ASTM D 638.

⑦ Yield strength: ASTM D 638.

⑧ MFR: ASTM D 1238 (270° C., 49N).

A polymer alloy having the formulation comprising the component polymers as shown in Table 1 was kneaded by a twin-screw extruder (cylinder temperature: 270° C.) and then pelletized to prepare an injection molding material. "Mixture A" used in the tests was a mixture comprising crystalline PP/PPE/SEBS=55/40/5 and having the mechanical properties of Comparative Example 1, and it was previously pelletized. "SEBS" here denotes a styrene-ethylene-butylene-styrene copolymer and acts as a compatibilizing agent for crystalline PP and PPE.

SPS used was one commercially available in the trademark of "S100" from Idemitsu Petrochemical Co., Ltd.

Using these molding materials, the tests were conducted by the above methods. The results are shown in Table 1. The following can be seen from the results of Table 1.

The three component polymer alloys of the Examples comprising crystalline PP and PPE blended with a given amount of SPS all increased in heat resistance (heat distortion temperature), impact resistance (Izod impact strength) and high-temperature rigidity (flexural modulus: 80° C.) as compared with the polymer alloy comprising only crystalline PP and PPE (Comparative Example 1). Furthermore, the former polymer alloys maintained a value of 100% or more in breaking extension which is a standard for pressure resistance. Fluidity (MFR) of the materials in the Examples was equal to or higher than that in Comparative Example 1.

On the other hand, in the case of Comparative Example 2 where content (addition amount) of SPS was too high (higher than 48%), heat resistance was the similar to that of conventional polymer alloys and, furthermore, the value of breaking extension was smaller than 100%.

TABLE 1

|  | Comparative Example 1 | Example 1 | Example 2 | Example 3 | Example 4 | Comparative Example 2 |
|---|---|---|---|---|---|---|
| Mixture A | 100 | 95 | 90 | 80 | 70 | 50 |
| Crystalline PP | 57.9 | 55.0 | 52.1 | 46.3 | 40.5 | 28.9 |
| PPE | 42.1 | 40.0 | 37.9 | 33.7 | 29.5 | 21.1 |
| SPS | 0 | 5 | 10 | 20 | 30 | 50 |
| Heat distortion temperature (° C.) 1.82 MPa | 101 | 109 | 113 | 114 | 112 | 103 |
| Izod impact strength (J/m) 23° C. | 277 | 331 | 461 | 326 | 371 | 365 |

TABLE 1-continued

|  | Comparative Example 1 | Example 1 | Example 2 | Example 3 | Example 4 | Comparative Example 2 |
|---|---|---|---|---|---|---|
| Flexural modulus (MPa) | | | | | | |
| 23° C. | 1790 | 1860 | 1900 | 1960 | 1980 | 2020 |
| 80° C. | 930 | 1040 | 1080 | 1190 | 1280 | 1390 |
| Flexural strength (MPa) | | | | | | |
| 23° C. | 55.6 | 58.1 | 59.7 | 63.3 | 64.4 | 65.6 |
| 80° C. | 27 | 30 | 31 | 33 | 34 | 34 |
| Breaking extension (%) 23° C. | 220 | 210 | 180 | 140 | 150 | 60 |
| Breaking strength (MPa) 23° C. | 41.5 | 39.9 | 41.3 | 38.3 | 37.9 | 29.4 |
| Yield strength (MPa) 23° C. | 34.9 | 36.5 | 38.3 | 39.4 | 40.0 | 41.3 |
| MFR (g/10 min) 270° C., 49N | 6.7 | 6.8 | 6.8 | 7.7 | 8.7 | 7.9 |

What is claimed is:

1. A polymer alloy comprising a crystalline polypropylene, a polyphenylene ether and a syndiotactic polystyrene where the polyphenylene ether is finely dispersed in the crystalline polypropylene and the syndiotactic polystyrene is dispersed in the polyphenylene ether, which provides a molded product having a heat distortion temperature (ASTM D 790) of 105° C. or higher and a high-temperature flexural modulus (ASTM D 790: 80° C.) of 1000 MPa or higher, wherein the content of the syndiotactic polystyrene in the polymer alloy is 2–41 wt %.

2. A polymer alloy according to claim 1, wherein the molded product further has a high-temperature flexural strength (ASTM D 790: 80° C.) of 29 MPa or more.

3. A polymer alloy according to claim 2, wherein the molded product further has an Izod impact strength (ASTM D 256: 23° C.) of 300 J/m or more.

4. A polymer alloy comprising 34–57 wt % of a crystalline polypropylene, 25–41 wt % of a polyphenylene ether and 2–41 wt % of a syndiotactic polystyrene, the weight ratio of the crystalline polypropylene/polyphenylene ether being 2/1–1/1, which provides a molded product having a heat distortion temperature (ASTM D 790) of 105° C. or higher and a high-temperature flexural modulus (ASTM D 790: 80° C.) of 1000 MPa or higher, wherein the content of the syndiotactic polystyrene in the polymer alloy is 2–41 wt %.

5. A resin molded product made by molding the polymer alloy of claim 1 or 4.

6. A resin molded product according to claim 5 which is a battery case.

7. A resin molded product according to claim 1 which is a part of anti-freeze systems for cars.

* * * * *